R. J. SHARP & M. QUELCH.
MEANS FOR AUTOMATICALLY INDICATING THE APPROXIMATE NUMBER OF WORDS AND
OTHER CHARACTERS WRITTEN BY TYPE WRITING MACHINES.
APPLICATION FILED SEPT. 9, 1909.
988,037.
Patented Mar. 28, 1911.
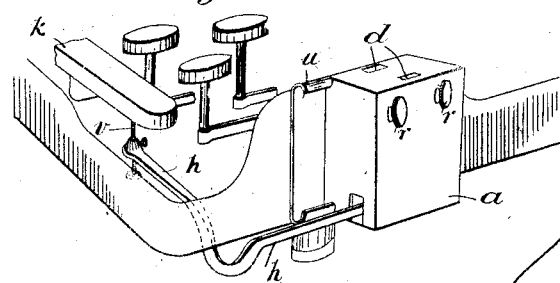
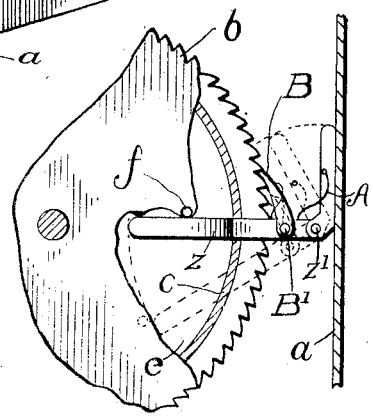
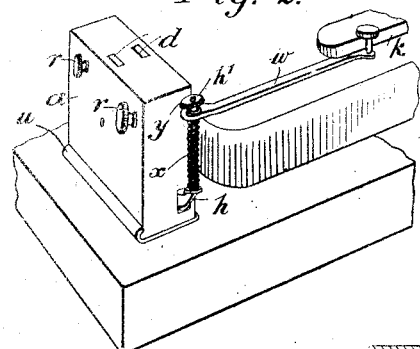
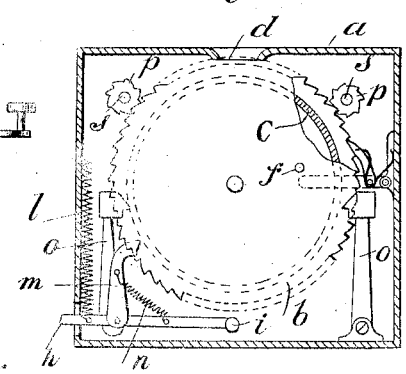
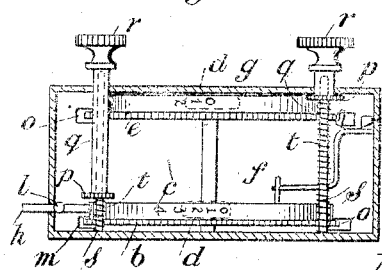
Inventors
Richard Joseph Sharp
Malcolm Quelch
Witnesses

UNITED STATES PATENT OFFICE.

RICHARD JOSEPH SHARP AND MALCOLM QUELCH, OF BRIGHTON, ENGLAND.

MEANS FOR AUTOMATICALLY INDICATING THE APPROXIMATE NUMBER OF WORDS AND OTHER CHARACTERS WRITTEN BY TYPE-WRITING MACHINES.

988,037.  Specification of Letters Patent.  Patented Mar. 28, 1911.

Application filed September 9, 1909. Serial No. 516,965.

*To all whom it may concern:*

Be it known that we, RICHARD JOSEPH SHARP, of 16 Preston Park avenue, Brighton, county of Sussex, solicitor, and MALCOLM QUELCH, of 34 Sydney street, Brighton, also of Sussex, England, solicitor's clerk, have invented new and useful Improvements in Means for Automatically Indicating the Approximate Number of Words and other Characters Written by Type-Writing Machines; and we do hereby declare that the following is a full, clear, and exact description of the same, reference being had to the accompanying drawings, forming a part hereof.

This invention relates to means to be used in combination with type writing machines for automatically indicating the number of words written upon such machines; and in carrying the same into effect we make use of a counting mechanism which we adapt in a suitable manner for the purpose, as hereinafter described, and attach to or connect with the type writing machine so that such mechanism may be operated by the movements of the spacing bar of the type writing machine.

The counting mechanism aforesaid consists of a set of wheels in train one with the other, and which wheels are toothed upon their peripheries and are each formed with a horizontally projecting flange. Upon the flange of one wheel are inscribed numerals which indicate the number of words or other characters written, and which numerals are brought consecutively, (as the words or the like are written and the wheel is rotated by the operations of the spacing bar) beneath a sighting space formed in a casing or cover with which the mechanism may be provided, or they may be otherwise brought separately, and distinctively to view. This wheel is formed with a number of teeth on its periphery corresponding to the number required to complete a given measure of words as, say, 72 teeth, when it is desired to count the number of words or the like in folios of 72 (as used by lawyers) so that in such instance one complete revolution of the wheel indicates a folio of 72 words, and when such revolution is completed a second wheel is actuated upon a horizontally extending flange on which are inscribed numerals which indicate the number of folios written. This second wheel is operated and moved one tooth or notch at every complete revolution of the first wheel aforesaid. Further wheels may be made use of, to be operated by the second wheel, or others provided, so that practically an unlimited number of words, separately or of folios, or other measures of words, and words collectively may be registered, if desired.

The mechanism above mentioned is operated by means of a lever pivoted at one end within the casing of the mechanism, or in any convenient position, carrying a pawl which engages with the teeth of the first wheel above mentioned of the mechanism, and is held in engagement by suitable springs provided. The said lever is extended through the casing or is made to project so that contact with the same is made by the spacing bar when the latter is moved or agitated by the operator at the end of a word or the like. The depression of the spacing bar depresses the pivoted lever and withdraws the pawl from the wheel but upon the release of the spacing bar the upward movement of the pivoted lever, consequent upon the action of the spring provided, as aforesaid, reëngages the pawl with the teeth of the wheel and causes it to rotate to the extent of one tooth and register the completion of one word or the like. The pawl above mentioned is pivoted to its supporting lever and is controlled by a spring which when the pawl is disengaged from the wheel tends to draw the pawl down to the extent of one tooth of the wheel so that as reëngagement is made the pawl takes against the next lower tooth to the one previously engaged with and as it rises to the full extent of the upward movement of the pivoted lever causes the wheel to turn to the extent of that one tooth. It will thus be seen that the counting mechanism records the number of movements of the space bar.

The casing or frame of the above described counting mechanism may be mounted in suitable guides or runners formed in a convenient position for the purpose upon the type writing machine or its stand in such manner that it may be drawn out of action when required.

Mechanism such as hereinafter described or of other suitable character may be provided for re-setting the counting mechanism when required.

In the accompanying drawings Figure 1 shows the counting mechanism above described attached to the frame of a type writing machine. Fig. 2 shows it as attached to the stand of the machine. Fig. 3, to an enlarged scale, shows the lever actuating the counting mechanism and the means employed for adjusting such lever to the various heights of the spacing bar to adapt the mechanism to different machines. Fig. 4 is a front elevational view of the counting mechanism with the cover removed and Fig. 5 is a plan of the same with the top removed. Fig. 6 is a fragmentary sectional view, partly in elevation, showing the manner of shifting the second wheel one step upon completion of each revolution of the first wheel. Fig. 7, shows a detail of wheel, "6."

$a$ represents the casing in which the counting mechanism is inclosed.

$b$ is the first wheel above mentioned and which is formed with 72 or other given number of teeth upon its periphery and with a horizontal flange $c$ imprinted with numerals up to 72 or other given number to indicate the number of words or other characters representing one folio or other measure of words or the like; $d$ are sighting spaces (see Figs. 1 and 2) in the casing $a$ to enable the numerals to be read. This wheel $b$ indicates the number of words or the like written up to one folio or other measure.

$e$ is the second wheel operated by the spur $f$ on the wheel $b$ in such manner that one complete revolution of the wheel $b$ moves the wheel $e$ one tooth. The flange $g$ on this wheel $e$ is imprinted with numerals which indicate the number of folios or other measure of words or the like written.

$h$ is the mechanism operating lever pivoted within the casing at $i$ and which is extended beyond the casing $a$ as shown, so as to be depressed at its outer end by the spacing bar $k$ when the latter is pressed downward by the operator at the end of a word or other character.

$l$ is the spring controlling the movement of the lever $h$ as aforesaid.

$m$ is the pawl pivoted to the lever $h$ and which engages with the teeth of the wheel $b$ and rotates the said wheel as and when the spacing bar $k$ is operated.

$n$ is the spring connected at one end to the pawl $m$ and at its other to the lever $h$ and $o, o,$ indicate pawls provided which engage with the toothed wheels aforesaid to prevent any backward movement of the same.

Though in the drawings only two numeral wheels are shown it will be understood that any number of such wheels may be made use of so engaging one with the other that any number of characters or folios may be registered separately or collectively without the instrument requiring re-setting.

Suitable mechanism may be provided for the purpose of re-setting the counting wheels and releasing the same from the pawls to enable them to be brought to the starting position when required. Such a mechanism consists of a cog wheel or pinion $p$ fixed upon a hollow spindle $q$ passing through the front of the casing $a$ and terminating in a milled head $r$ outside the casing. The hollow spindle $q$ fits upon a rod or pin $s$ fixed to the back of the casing $a$ and is capable of sliding upon the end thereof, a spring $t$ surrounds the pin $s$ and is interposed between the back of the casing and the cog $p$, aforesaid and tends to keep the cog out of gear with the toothed counting wheel. When, however, it is required to re-set the mechanism to its starting position the head $r$ is pressed inwardly until the cog $p$ engages with its toothed counting wheel and the said milled head $r$ is then turned until the counting wheel is in its required position. Then upon being released the cog is thrown out of gear by means of the spring $t$ aforesaid. The mechanism in its casing as above described is attached to the frame or stand of the type writing machine in a position suitable for the operations of the spacing bar to actuate the counting wheels by means of the pivoted lever and its pawl in the manner above described, and is mounted in runners or guides $u$ so that the same may be brought in and out of action as required; while to adjust the device to the varying heights of the spacing bars in different machines the pivoted lever $h$ aforesaid (see particularly Fig. 1) is fitted at its end with a screwed pin $v$ with which contact is made with the spacing bar $k$ and which may be adjusted to suit requirements, or, as shown in Figs. 2 and 3 the lever $h$ may terminate in a vertical screwed portion $h'$ upon which the contact arm or member $w$ is supported on the spring $x$ and the height or level of such arm $w$ may be regulated by means of the nut $y$ screwed upon the end $h'$ of the lever $h$.

What we claim as our invention and desire to secure by Letters Patent is:—

1. A word counting device for typewriters comprising in combination, a typewriter spacing key, counting wheels arranged to be actuated from said key and provided with teeth, and a zero mechanism for returning said wheels to a starting position comprising rods extending abreast of said wheels, springs on said rods, wheels slidably mounted on said rods and held normally out of mesh with said counting wheels by said springs, and means for forcing said wheels into mesh with said counting wheels.

2. A word counting device for typewriters comprising in combination, a typewriter spacing key, counting wheels arranged for actuation therefrom, and provided with teeth, a casing for said wheels, rods mounted in said casing and extending abreast of said wheels, springs on said rods, and sleeves on said rods projecting through said casing and carrying gear wheels normally held out of mesh with the counting wheels by said springs, and means on the ends of said sleeves for thrusting said gear wheels into mesh with said counting wheels.

In witness whereof we affix our signatures in presence of two witnesses.

RICHARD JOSEPH SHARP.
MALCOLM QUELCH.

Witnesses:
GEO. COXHEAD,
GEO. HUGHES.